US009413269B2

(12) United States Patent
Ayyanar

(10) Patent No.: US 9,413,269 B2
(45) Date of Patent: Aug. 9, 2016

(54) CIRCUITS AND METHODS FOR PHOTOVOLTAIC INVERTERS

(71) Applicant: Arizona Board of Regents, for and on behalf of, Arizona State University, Scottsdale, AZ (US)

(72) Inventor: Rajapandian Ayyanar, Gilbert, AZ (US)

(73) Assignee: Arizona Board of Regents, for and on behalf of, Arizona State University, Scottsdale, AZ (US)

( * ) Notice: Subject to any disclaimer, the term of this patent is extended or adjusted under 35 U.S.C. 154(b) by 34 days.

(21) Appl. No.: 14/410,617

(22) PCT Filed: Jun. 25, 2013

(86) PCT No.: PCT/US2013/047707
§ 371 (c)(1),
(2) Date: Dec. 23, 2014

(87) PCT Pub. No.: WO2014/004575
PCT Pub. Date: Jan. 3, 2014

(65) Prior Publication Data
US 2015/0372615 A1    Dec. 24, 2015

Related U.S. Application Data

(60) Provisional application No. 61/760,998, filed on Feb. 5, 2013, provisional application No. 61/664,074, filed on Jun. 25, 2012.

(51) Int. Cl.
*H02J 1/10* (2006.01)
*H02M 7/537* (2006.01)
(Continued)

(52) U.S. Cl.
CPC ............... *H02M 7/537* (2013.01); *H02M 1/15* (2013.01); *H02M 7/48* (2013.01); *H02J 3/383* (2013.01); *H02J 3/385* (2013.01); *H02M 7/487* (2013.01); *Y02E 10/563* (2013.01); *Y02E 10/58* (2013.01)

(58) Field of Classification Search
CPC ... H02M 7/5387; H02M 3/158; H02M 3/337; H02J 9/062
USPC ......... 363/16, 17, 21.03, 21.04, 56.03, 56.05, 363/71, 97, 98, 124, 127; 323/222, 224, 323/282–288; 307/45, 85
See application file for complete search history.

(56) References Cited

U.S. PATENT DOCUMENTS 4,833,584 A    5/1989    Divan
4,939,633 A    7/1990    Rhodes et al.
(Continued)

FOREIGN PATENT DOCUMENTS

DE    10221592    12/2003
EP    1626494    11/2010
WO    WO/2007/048420    5/2007

OTHER PUBLICATIONS

Boeke, U. and Van der Broeck, H., "Transformer-less converter concept for a grid-connection of thin-film photovoltaic modules", In Proceedings of IEEE Industry Applications Society Annual Meeting, Oct. 5-9, 2008, pp. 1-8.
(Continued)

*Primary Examiner* — Rajnikant Patel
(74) *Attorney, Agent, or Firm* — Byrne Poh LLP

(57) ABSTRACT

Circuits and methods for photovoltaic inverters are provided. In some embodiments, a power inverter circuit is provided, the inverter comprising: an input terminal for a direct current source coupled to a first conductor; a first side of a capacitor coupled to the input terminal; a second input terminal for the direct current source coupled to first sides of a first switch and second switch; a second side of the capacitor coupled to first sides of a third switch and fourth switch; a first side of a first inductor coupled to the first input terminal, the first side of the capacitor and the first conductor; a second side of the first inductor coupled to second sides of the first switch and third switch; and a first side of a second inductor coupled to a second conductor, and second sides of the second switch and fourth switch.

22 Claims, 5 Drawing Sheets

(51) Int. Cl.
*H02M 1/15* (2006.01)
*H02M 7/48* (2007.01)
*H02J 3/38* (2006.01)
*H02M 7/487* (2007.01)

(56) References Cited

U.S. PATENT DOCUMENTS

| | | | | |
|---|---|---|---|---|
| 5,875,103 | A * | 2/1999 | Bhagwat | H02M 3/3376 363/17 |
| 6,104,624 | A * | 8/2000 | Iwamoto | H02M 7/48 307/82 |
| 6,720,675 | B2 * | 4/2004 | Azuma | H02J 7/022 307/82 |
| 6,807,070 | B2 * | 10/2004 | Ribarich | H02M 3/3382 363/17 |
| 7,064,969 | B2 | 6/2006 | West | |
| 7,336,004 | B2 * | 2/2008 | Lai | H02J 9/062 307/66 |
| 7,960,863 | B2 | 6/2011 | Fife et al. | |
| 2011/0261593 | A1 | 10/2011 | Pan et al. | |
| 2012/0087157 | A1 | 4/2012 | Huang et al. | |

OTHER PUBLICATIONS

Burger, B. and Kranzer, D., "Extreme High Efficiency PV-power Converters", In Proceedings of the 13th European Conference on Power Electronics and Applications, Sep. 2009, pp. 1-13.

Gonzalez, R., et al., "Transformerless Inverter for Single-Phase Photovoltaic Inverter System", In IEEE Transactions on Power Electronics, vol. 18, Mar. 2007, pp. 704-711.

International Preliminary Report on Patentability dated Jan. 30, 2014 In International Application No. PCT/US2013/047707.

International Search Report dated Nov. 22, 2013 in International Patent Application No. PCT/US13/47707.

Patrao, I., et al., "Transformerless Topologies for Grid-Connected Single-Phase Photovoltaic Inverters", In Renewable and Sustainable Energy Reviews, vol. 15, Sep. 2011, pp. 3423-3431.

Rodriguez, J., et al., "A Survey on Neutral Point Clamped Inverters", In IEEE Transactions on Industrial Electronics, Jun. 2010, pp. 2219-2230.

Shen, J.M., et al., "Novel Transformerless Grid-Connected Power converter with Negative Grounding for Photovoltaic Generation System", In IEEE Transactions on Power Electronics, vol. 27, No. 4, Apr. 2012, pp. 1818-1829.

Shimizu, T., et al., "A Novel High-Performace Utilityinteractive Photovoltaic Inverter System", In IEEE Transactions on Power Electronics, vol. 18, Mar. 2003, pp. 704-711.

Teodorescu, R., et al., "Grid Converters for Photovoltaic and Wind Power Systems", Chapter 4, John Wiley & Sons, Inc., Feb. 2011, pp. 43-90.

Written Opinion in International Patent Application No. PCT/US13/47707, filed Jun. 25, 2013.

* cited by examiner

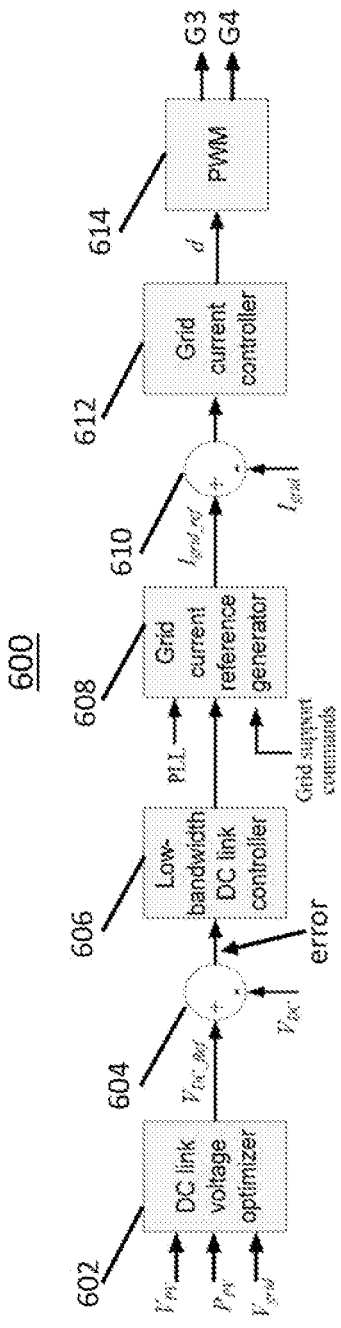
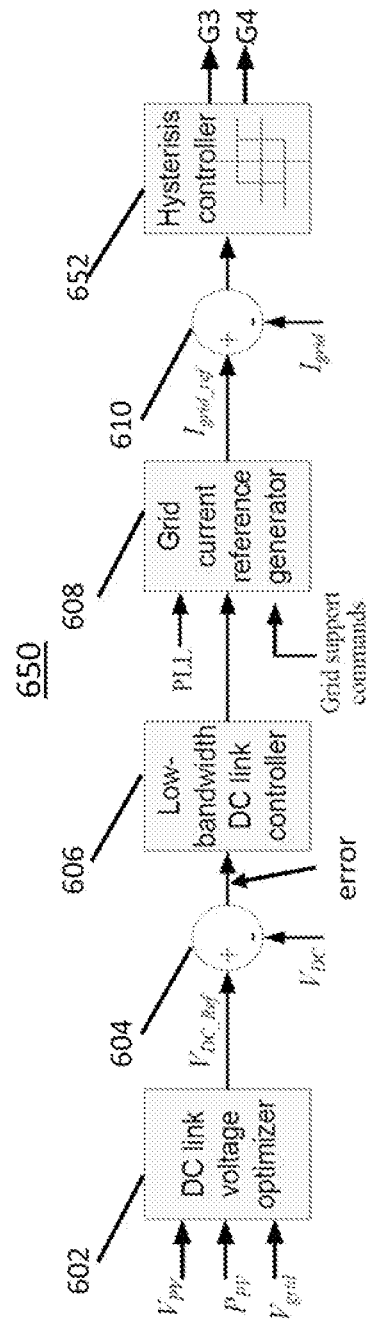
FIG. 6A
FIG. 6B

CIRCUITS AND METHODS FOR PHOTOVOLTAIC INVERTERS

CROSS-REFERENCE TO RELATED APPLICATIONS

This application claims the benefit of U.S. Provisional Patent Application No. 61/760,998, filed Feb. 5, 2013, and U.S. Provisional Patent Application No. 61/664,074, filed Jun. 25, 2012, each of which is hereby incorporated by reference herein in its entirety.

TECHNICAL FIELD

The disclosed subject matter relates to circuits and methods for photovoltaic inverters.

BACKGROUND

Power converters including one or more transformers are typically used for converting a signal from a direct current (DC) source, such as photo-voltaic (PV) panels, to an alternating current (AC) signal. One reason power might need to be converted from DC to AC is to allow a DC power source to supply power for transmission on an AC electrical grid (referred to herein as "the grid"). Another reason power might need to be converted from DC to AC is to allow a DC power source to power an AC load.

Using transformers in power conversion—either line frequency or high (switching) frequency type—can contribute to higher costs, can cause additional losses and lower efficiency, can contribute to complexity of topology (or configuration), and can increase size and weight. Therefore, there is a need for transformer-less configurations for converting DC power to AC power. However, eliminating the transformer can cause other issues, such as, eliminating galvanic isolation between PV panels and the grid.

Although codes and standards for PV inverters (e.g., power converters for conversion of DC power from PV panels to AC power for an AC load) have begun to support such transformer-less configurations, there are several issues that need to be addressed. One problem is a safety hazard due to the lack of galvanic isolation between the PV panels and the grid. This can be addressed by requiring PV inverters to have extensive and reliable ground fault interruption mechanisms.

Another problem in transformer-less configurations is related to large, capacitive ground currents. Typical PV modules have significant capacitance (on the order of 100 nanofarads per kilowatt) between the PV cells that make up the module and the chassis of the PV panel. This is sometimes referred to as a parasitic capacitance. The chassis of a PV panel is typically required to be grounded, and therefore, the parasitic capacitance between the PV and the chassis also becomes a parasitic capacitance between PV and the ground. In conventional transformer isolated configurations, it is possible to connect either the positive or negative end of a PV string (e.g., a string of PV modules) to ground, thereby making the voltage across the parasitic capacitances zero or a constant direct current (DC) voltage. However, in conventional transformer-less configurations, such grounding can lead to short circuiting the PV voltage periodically as the inverter switches go through the pulse-width modulation (PWM) switching pattern. Therefore, such grounding is not typically used in conventional transformer-less configurations. As a consequence, during ungrounded operation the voltages across the parasitic capacitances between the PV cells and the ground, referred to as the common mode voltages, can pulsate between different values depending on the configuration (e.g., Vdc, 0, and −Vdc) at the switching frequency. This can result in large, undesirable capacitor currents that can interfere with normal operation.

Several variations of the conventional bridge type inverter topology have been proposed to mitigate the problems associated with the capacitive currents in transformer-less PV applications. These configurations typically involve the addition of switches and diodes to isolate the grid from the positive or negative terminals of the PV string during part of the switching cycle. This can reduce the common mode voltage, and thereby reduce the capacitive currents. However, it should be noted that these solutions can reduce the magnitude of pulsation in common mode voltage, but do not fully eliminate the pulsations.

Another problem in single-phase PV inverters, with or without transformers, is power pulsation at twice the line frequency (e.g., at 120 hertz (Hz) where the line frequency is 60 Hz, as in the United States). In order to capture maximum power from a PV string, the power drawn from the PV string should be kept as close to a constant power (e.g., a constant DC power) as possible. In contrast, power injected into a single-phase grid should have a constant component (e.g., a constant DC component) as well as a pulsating component AC component (e.g., 120 Hz AC). The difference between the DC power of the PV string and the combined power of the single-phase grid can be compensated for by utilizing a storage element. Conventionally, large electrolytic capacitors have been used to support such large power pulsations while keeping the DC link voltage fairly constant. However, electrolytic capacitors are among the leading causes of failure in PV inverters and represent a reliability concern. Furthermore, depending on the configuration, the 120 Hz power oscillation can be reflected in the power drawn from the PV panel resulting in reductions in efficiency that can substantially reduce energy harvest.

Accordingly, new circuits and methods for photoelectric inverters are desirable.

SUMMARY

In accordance with some embodiments of the disclosed subject matter, circuits and methods for photovoltaic inverters are provided.

In accordance with some embodiments a power inverter circuit is provided, the power inverter circuit comprising: a first input terminal for connection to a first side of a direct current source coupled to a first conductor of an alternating current transmission line; a first side of a capacitor coupled to the first input terminal; a second input terminal for connection to a second side of the direct current source coupled to a first side of a first switch and a first side of a second switch; a second side of the capacitor coupled to a first side of a third switch and a first side of a fourth switch; a first side of a first inductor coupled to the first input terminal, the first side of the capacitor and the first conductor, a second side of the first inductor coupled to a second side of the first switch and a second side of the third switch; and a first side of a second inductor coupled to a second conductor of an alternating current transmission line, a second side of the second switch and a second side of the fourth switch.

In accordance with some embodiments, a power inverter circuit is provided, the power inverter circuit comprising: a first input terminal means for connecting to a first side of a direct current source and coupled to a first conductor of an alternating current transmission line; a first side of a capacitance means for causing a capacitance to be provided coupled to the first input terminal means; a second input terminal means for connecting to a second side of the direct current source and coupled to a first side of a first switching means for causing a first circuit to be alternately substantially shorted or opened and coupled to a first side of a second switching means for causing a second circuit to be alternately substantially shorted or opened; a second side of the capacitor means coupled to a first side of a third switching means for causing a third circuit to be alternately substantially shorted or opened and a first side of a fourth switching means for causing a fourth circuit to be alternately substantially shorted or opened; a first side of a first induction means for causing an inductance to be provided coupled to the first input terminal means, the first side of the capacitance means and the first conductor; a second side of the first induction means coupled to a second side of the first switching means and a second side of the third switching means; and a first side of a second induction means for causing an inductance to be provided coupled to a second conductor of an alternating current transmission line, a second side of the second switching means and a second side of the fourth switching means.

In some embodiments, the capacitance means provides a capacitance that allows a voltage across the capacitance means to vary over a range of between 100 percent and 200 percent of a voltage across the first conductor and second conductor during operation of the power inverter circuit.

In some embodiments, the second input terminal means is coupled to a first side of a fifth switching means for causing a fifth circuit to be alternately substantially shorted or opened, and wherein the power inverter circuit further comprises: a sixth switching means for causing a sixth circuit to be alternately substantially shorted or opened having a first side coupled to a first side of the second side of the third switching means and a first side of the fourth switching means, and a second side of the sixth switching means coupled to a second side of the fifth switching means and a first side of a third induction means for causing an inductance to be provided, wherein a second side of the third induction means is coupled to a third conductor of the alternating current transmission line.

In some embodiments, the power inverter circuit further comprises control means for controlling a phase shift between first control signals that control a state of the second switch and a state of the fourth switch and second control signals that control a state of the fifth switch and a state of the sixth switch to reduce a switching frequency ripple in a current on the first conductor.

In some embodiments, the power inverter circuit further comprises: a control means for controlling a state of the first switch and a state of the third switch such that a maximum power point of an output of a direct current source coupled across the first input terminal and the second input is tracked, the control circuit comprising: a maximum power point tracking means for outputting a reference current for the direct current source using a voltage output of the direct current source and a current output of the direct current source as inputs; and a proportional integral controlling means for outputting a duty cycle at which to control the first switch and the third switch to yield a maximum power output from the direct current source that uses a difference between the reference current and the current output of the direct source as an input.

In some embodiments, the power inverter further comprises: a control means for controlling a state of the second switching means and a state of the fourth switching means for maximizing a power conversion efficiency of the power inverter circuit is based on a voltage output of the direct current source, a current output of the direct current source, and a voltage of the second conductor of the alternating current transmission line.

In some embodiments, the state of the second switch and the state of the fourth switching means is controlled based on an output of either (i) a pulse width modulating means for driving the second switching means and the fourth switching means, or (ii) a hysteresis controlling means for driving the second switching means and the fourth switching means.

In some embodiments, the power inverter circuit further comprises a control means for controlling a phase shift between first control signals that control a state of the first switch and a state of the third switch and second control signals that control a state of the third switch and a state of the fourth switch to reduce a switching frequency ripple in a voltage across the first conductor and the second conductor.

In some embodiments, the power inverter circuit further comprises a photovoltaic direct current means for supplying a direct current coupled between the first input terminal means and the second input terminal means.

In some embodiments, an output voltage of the power inverter circuit is an alternating current signal having a root mean square voltage of between 120 V RMS and 240 V RMS.

In some embodiments, the capacitance means provides a capacitance of between about 10 microfarads per kilowatt of output power and about 30 microfarads per kilowatt of power.

BRIEF DESCRIPTION OF THE DRAWINGS

Various objects, features, and advantages of the present invention can be more fully appreciated with reference to the following detailed description of the invention when considered in connection with the following drawing, in which like reference numerals identify like elements.

FIGS. 6A and 6B show examples of control circuitry for another portion of a photovoltaic inverter in accordance with some embodiments of the disclosed subject matter.

DETAILED DESCRIPTION

In accordance with some embodiments, circuits and methods for providing photo-voltaic inverters are provided.

Figure 1:
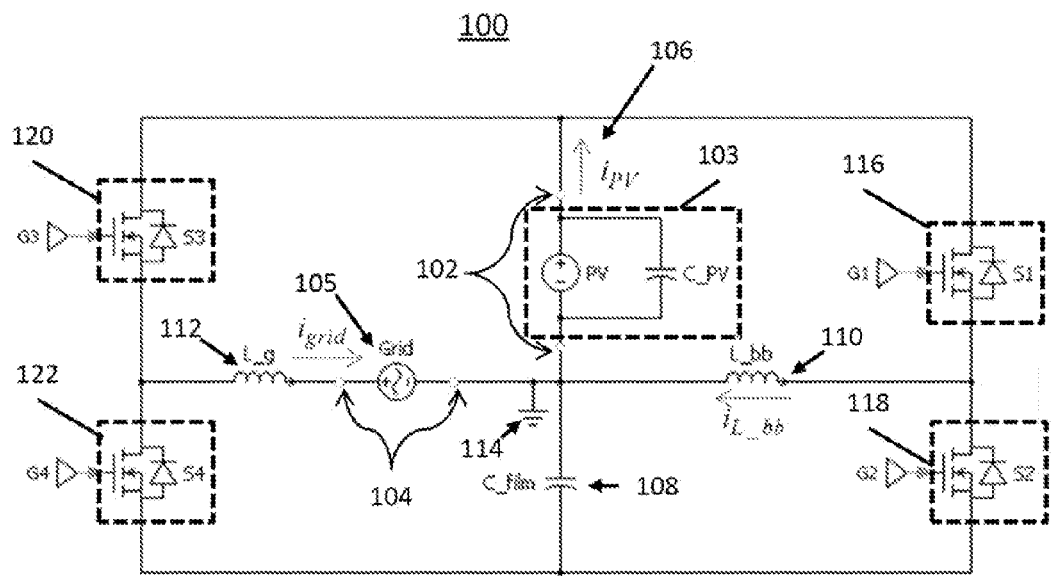
FIG. 1 shows an example of a photovoltaic inverter in accordance with some embodiments of the disclosed subject matter.

In accordance with some embodiments, FIG. 1 shows an example 100 of a photovoltaic inverter. As illustrated, photovoltaic inverter 100 can include inputs 102 for receiving a photovoltaic panel's (or set of panels') 103 output, output 104 for providing power to a two-wire single-phase grid 105, a first capacitor 108, a first inductor 110, a second inductor 112, a ground connection 114 (e.g., in cases where one terminal of grid 105 is neutral), and switches 116, 118, 120, and 122.

As shown in FIG. 1, in inverter 100, a PV negative terminal of PV 103 can be connected directly to one of the terminals of grid 105. For example, as shown, the PV negative terminal can be connected to a neutral conductor of grid 105. This can effectively ground the PV negative terminal, thereby allowing the voltage difference between capacitance(s) of PV 103 and ground to be zero.

In some embodiments, the PV negative terminal can be connected to one conductor of a multi-phase system in a case where neutral is not used. For example, in the case of a split-phase 240 V system (where neutral is not in use) or a two-phase 208 V system, the voltage across an inherent capacitance(s) associated with PV 103 (note that such capacitance(s) is not shown, but can be associated with for example, a capacitance between a photovoltaic cell and a chassis to which the photovoltaic cell is mounted), can be 120 V RMS (root mean square voltage) at 60 Hz and free of high frequency switching components. Due to the low frequency voltage, the capacitive currents can be negligible. Applications to a split-phase 120/240 V systems with a neutral are described hereinbelow in connection with FIG. 2.

In some embodiments, direct, high-bandwidth control of the PV current, $i_{PV}$ 106, can be used to ensure that the value of the in is a proper DC current for maximum power extraction.

In some embodiments, a combination of a modified bi-directional buck-boost DC-DC converter including at least 108, 110, 116 and 118 and a half-bridge inverter including at least 108, 112, 120 and 122 can be provided. The PV input voltage can form one of the two voltage levels used by the half-bridge inverter, and the traditional buck-boost output (across capacitor 108) can form the second voltage level used by the half-bridge inverter.

In accordance with some embodiments, the buck-boost converter can be bi-directional, with the buck boost current, $i_{L\_bb}$, through the buck-boost inductor 112 also bi-directional, enabled by switches 116 and 118. This can allow capacitor 108 to support power injection into grid 105 in both the positive and the negative half cycles (at line frequency, e.g., 60 Hz). In particular, the input current from PV, $i_{PV}$, can be measured and can be directly controlled in closed-loop to be a constant DC current (note that a switching frequency component of $i_{PV}$ can be ignored as it is handled by $C_{PV}$) at a magnitude corresponding to the maximum power point (MPP) current value, and the PV voltage can be maintained at a constant DC voltage corresponding to the MPP voltage value. This can allow more accurate maximum power point tracking compared to other transformer-less configurations. The difference between the instantaneous AC power output to grid 105 and the DC power of PV 103 can be handled by capacitor(s) 108. Furthermore, the buck-boost inductor current, $i_{L\_bb}$, can be bi-directional and can ensure that the PV current is a smooth DC and that all the 120 Hz power pulsations are handled by capacitor(s) 108.

Because capacitor(s) 108 is not directly across PV 103, its voltage ($V_{C\_film}$) can be allowed to have a large swing. In some embodiments, a controller can allow this voltage to vary over a wide range (e.g., over 200% variation) such that the capacitance required to handle a given 120 Hz power pulsation can be kept small enough to be implemented using film or ceramic capacitors. The precise DC value of the capacitor voltage as well as the peak-to-peak variation can be optimized for each configuration taking into consideration the capacitance required and the switch voltage ratings and losses. In some embodiments, any suitable capacitor value can be used in capacitor 108. For example, a capacitance in the range of about ten microfarads per kilowatt of output power to about thirty microfarads per kilowatt of output power can generally be used. In a more particular example, a capacitance of 60 microfarads can be used with an output power of 4 kilowatts.

In some embodiments, the buck-boost converter can directly control the current from the PV based on reference from a maximum power point tracking (MPPT) algorithm. Additionally or alternatively, the output voltage of the buck-boost converter can be controlled in a cascaded control loop. Examples of control circuitry for operating photovoltaic inverter 100 are described in connection with FIGS. 5, 6A, and 6B.

In some embodiments, using configurations described herein can allow interleaving between the half-bridge and the buck-boost sections which can reduce switching frequency ripple at the input of the half-bridge and buck-boost stages.

In some embodiments, the DC value and the peak-to-peak swing can be adaptive based on the operating conditions (e.g., ambient temperature, the amount of power being generated by the PV, etc.). In some embodiments, a controller of the half-bridge inverter can take into consideration large variations in the DC link voltage in one of the two levels. Examples of a controller of the half-bridge inverter are described in connection with FIGS. 6A and 6B. In some embodiments, the PV negative or positive terminal (for example, PV+ or PV− as shown in FIG. 1) can be connected to ground and/or connected to one of the AC conductors (e.g., phase and/or neutral).

Figure 2:
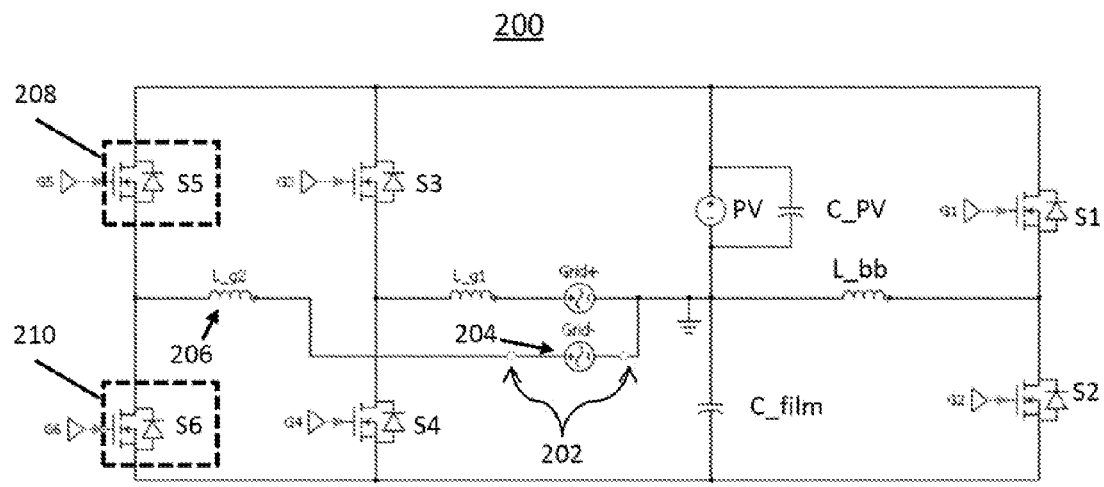
FIG. 2 shows an example of a second photovoltaic inverter in accordance with some embodiments of the disclosed subject matter.

Turning to FIG. 2, an example 200 of a photo-voltaic inverter for use with a three-wire, split-phase 120/240 V system with an available neutral conductor is shown in accordance with some embodiments. As shown in FIG. 2, the configuration of FIG. 1 can be adapted by adding a second half-bridge section interfacing to a second split-phase 204 of the grid having terminals 202, an inductor 206 ($L_{g2}$), as well as a third set of switches 208 and 210. The configuration shown in FIG. 2 can be controlled with a mechanism similar to that used for the control of the configuration shown in FIG. 1. For example, the control methods described in connection with FIGS. 5, 6A, and 6B can be extended to the configurations described in FIG. 2. Additionally or alternatively, the power flow into each of the split phases can be individually controlled, for example, to offset any unbalance in the loads connected to each of the two split phases (e.g., Grid+ and Grid−).

Figure 3:
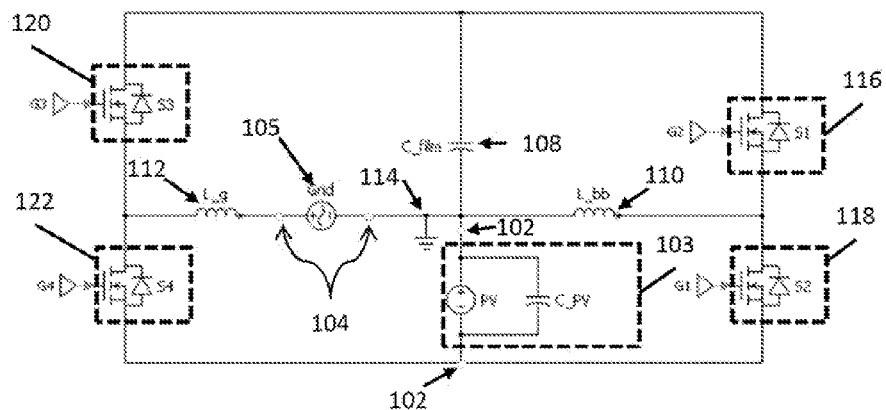
FIG. 3 shows an example of a third photovoltaic inverter in accordance with some embodiments of the disclosed subject matter.

FIG. 3 shows an example 300 of a photo-voltaic inverter for use with a two-wire, single-phase system in accordance with some embodiments. As shown in FIG. 3, the positive PV terminal can be grounded.

Figure 4:
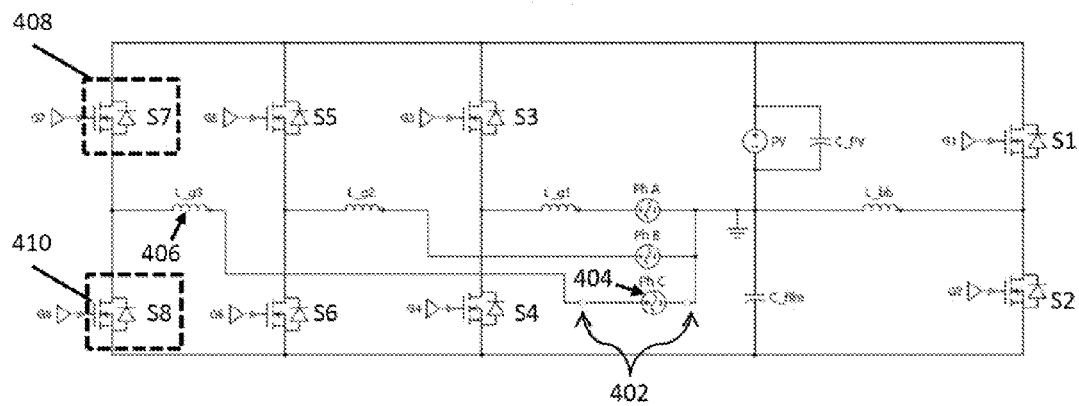
FIG. 4 shows an example of a fourth photovoltaic inverter in accordance with some embodiments of the disclosed subject matter.

FIG. 4 shows an example 400 of a photo-voltaic inverter for use with a four-wire, three-phase system in accordance with some embodiments. For example, a third pole (Ph C) 404 having terminals 402, and a third inductor ($L_{g3}$) 406 can be added to the configuration of FIG. 2. A fourth set of switches 408 and 410 can also be added. As shown, this can result in outputs of three phases, Ph A, Ph B, and Ph C.

In some embodiments, the half-bridge can be controlled to ensure stable operation and good power quality with a widely varying voltage across capacitance 108, and unequal voltages of the two voltage levels (e.g., the PV voltage and the voltage across capacitance 108. For example, control methods can include peak current mode control, hysteresis current control and variable frequency control schemes. Examples of a controller of the half-bridge inverter are described below in connection with FIGS. 6A and 6B.

In some embodiments, the grid current ($i_{grid}$, as shown in FIG. 1) can be controlled to have any required power factor (similar to conventional inverters), and can be used to provide grid support functions.

In some embodiments, the switching pattern and phase shift between the drive signals for the half-bridge and buck-boost stage can reduce switching frequency ripple (in the PV voltage and/or other parameters). For example, signals for driving switches 116 and 118 can be phase shifted with respect to signals for driving switches 120 and 122. Additionally, in some embodiments, the phase shift can be controlled by a control circuit (not shown) to reduce and/or minimize switching frequency ripple over the PV voltage.

In some embodiments, the switching pattern and phase shift between the drive signals for different half bridge sections (e.g., as described in connection with FIGS. 2 and 4) can reduce switching frequency ripple in a current provided to the grid (or other output). For example, signals for driving switches 120 and 122 can be phase shifted with respect to signals for driving switches 208 and 210. Additionally, in some embodiments, the phase shift between drive signals can be controlled by a control circuit to reduce or minimize switching frequency ripple over difference phases of grid 105 and grid 204.

In some embodiments, advanced semiconductor materials and devices (e.g., Gallium Nitride MOSFETs) can be used for efficient power conversion.

A particular example using a grid voltage of 240 V RMS is described in accordance with FIG. 1. It should be noted that in this example, the negative terminal of the PV is connected to one of the phases, not to ground/neutral. In this example, the capacitance of capacitor 108 is 120 microfarads and this results in a voltage swing of roughly 200 V over capacitor 108. The buck-boost inductor current, $i_{L\_bb}$, is bi-directional and has a 120 Hz component.

In another example using a grid voltage of 240 V RMS, a capacitance of capacitor 108 is 60 microfarads. In this example, the voltage swing is larger than in the example using a capacitance of 120 microfarads (e.g., about 350 V compared to 200 V in the previous example). Further, in this example, the DC bias value has been changed to about 500 V from 400 V in the previous example to accommodate the larger voltage swing.

Figure 5:
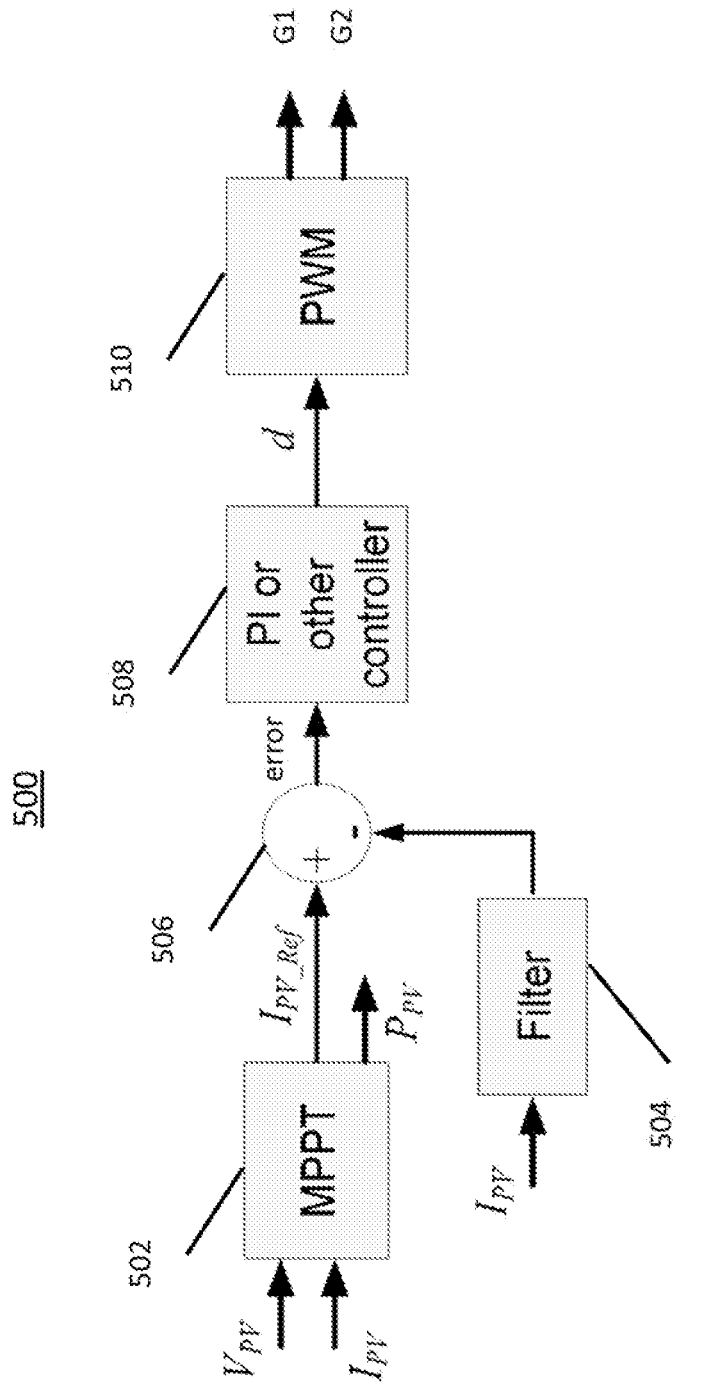
FIG. 5 shows an example of control circuitry for a portion of a photovoltaic inverter in accordance with some embodiments of the disclosed subject matter.

The power inverter mechanisms described herein can be controlled using any suitable control techniques. For example, FIG. 5 is an example of a control technique for controlling the buck-boost converter to maintain maximum power point tracking. FIGS. 6A and 6B are examples of control techniques for controlling the grid current based on an inner current loop with pulse width modulation or hysteresis respectively.

Turning to FIG. 5, an example 500 of control circuitry for controlling switches 116 and 118 is illustrated in accordance with some embodiments. As illustrated, voltage $V_{PV}$ and current $I_{PV}$ from PV 103 can be input to a maximum power point tracking (MPPT) circuit 502. MPPT 502 can, using $V_{PV}$ and $I_{PV}$ as inputs, output a power $P_{PV}$ being output by PV 103 and a reference current $I_{PV\_Ref}$ that will result in maximum power output from PV 103. Control circuitry 500 can compare $I_{PV\_Ref}$ to $I_{PV}$ using a circuit 506 to find the difference between the value of $I_{PV}$ and the value of $I_{PV\_Ref}$ (as shown in FIG. 5). Before being input to circuit 506, $I_{PV}$ can also be filtered at filter 504 to remove high frequency components from $I_{PV}$ that can result from switching performed in the inverter circuits described herein.

The output of circuit 506 can indicate a difference (or error) between the reference current, $I_{PV\_Ref}$, that would result in the maximum power point of PV 103 as indicated by MPPT circuit 502 and the actual current, $I_{PV}$, that is being output by PV 103. The output of circuit 506 can be input to a proportional integral controller 508 that processes the error in the current $I_{PV}$ that is output by PV 103 to generate a duty cycle, d, at which to drive switches 116 and 118 of the inverter circuit (e.g., the circuit described in connection with FIG. 1). Duty cycle d can then be compared to a reference carrier waveform in Pulse Width Modulator (PWM) 510, to generate gate drive signals for the DC-DC stage (e.g., signals G1 and G2 to control switches 116 and 118 of FIG. 1) such that $I_{PV}$ converges to $I_{PV\_Ref}$ in order to extract the maximum power from PV 103. In some embodiments, switches 116 and 118 can be driven complementarily.

Alternatively, in some embodiments, voltages (e.g., $V_{PV}$ and $V_{PV\_Ref}$) can be compared rather than currents. In such an embodiment, MPPT 502 can be configured to output a reference voltage $V_{PV\_Ref}$ rather than reference current $I_{PV\_Ref}$.

FIG. 6A shows an example 600 of control circuitry for controlling switches 120 and 122 in accordance with some embodiments. In some embodiments, control circuitry 600 can have a cascaded control structure with an inner loop used to control the grid current $I_{grid}$ and an outer loop used to provide a current reference based on regulating a DC link voltage, a feed forward signal from a MPPT circuit, and grid support requirements (e.g., power factor, reactive power control, etc.).

As illustrated, voltage $V_{PV}$ and current $I_{PV}$ from PV 103 and grid voltage $V_{grid}$ can be input to a DC link voltage optimizer 602. DC link voltage optimizer can output a voltage, $V_{DC\_Ref}$ that represents a DC link voltage across capacitor 108 at which power conversion efficiency is maximized. In some embodiments, DC link voltage optimizer 602 can be adaptive based on operating conditions (e.g., temperature, amount of light, etc.).

The reference voltage $V_{DC\_Ref}$ can be compared to the DC component of the dynamically variable voltage across capacitor 108, referred to as $V_{DC}$ using a voltage difference circuit 604 and the output (e.g., error) can be processed by a low-bandwidth proportional integral (PI) controller 606 that processes the error in the DC link voltage to generate an amplitude (e.g., a peak value) of the current reference. Limiting the PI controller 606 to a low-bandwidth can limit distortions from a high frequency component (e.g., a 120 Hz component) of the DC link voltage from affecting the current reference.

The output of low-bandwidth PI controller 606 can be further processed by Grid current reference generator 608 that generates a grid current reference $I_{grid\_ref}$. In order to generate a proper $I_{grid\_ref}$, generator 608 can also use the output of a phase-locked loop (PLL) and grid support commands (e.g., power factor, reactive power control, etc.). The PLL signal can be a signal that was generated by a phase-locked loop using the phase of the grid voltage as a reference. This can result in the PLL signal being a signal that is in phase with the grid voltage. This PLL signal can be used to ensure that the phase of the output signal of the inverter matches the phase of the grid voltage. Any suitable phase-locked loop technique or techniques and/or circuits can be used to generate the PLL signal. For example, phase-locked loop techniques are discussed in chapter 4 of "Grid Converters for Photovoltaic and Wind Power Systems" by R. Teodorescu, M. Liserre, and P. Rodriguez, Wiley Publishers, 2011, which is hereby incorporated by reference herein in its entirety.

The phase of the grid current reference $I_{grid\_ref}$ can be determined from the PLL signal and grid support commands (e.g., grid power factor requirements) and the amplitude of $I_{grid\_ref}$ can be determined based on the signal from the low-bandwidth PI controller 606 and a MPPT feed forward signal (e.g., a signal $P_{PV}$ from MPPT 502).

Grid current reference $I_{grid\_ref}$ can be compared to the grid current $I_{grid}$ currently being output by the inverter using current difference circuit 610 to generate an error signal that can be used to generate drive signals for switches 120 and 122. In some embodiments, a grid current controller 612 can operate using similar techniques to PI controller 508 or a proportion resonant (PR) controller to output a duty cycle d at which to drive switches 120 and 122 of the inverter circuit (e.g., the circuit described in connection with FIG. 1). Duty cycle d can then be compared to a reference carrier waveform in Pulse Width Modulator (PWM) 614, to generate gate drive signals for the DC-AC stage (e.g., signals G3 and G4 to control switches 120 and 122 of FIG. 1) such that $I_{grid}$ converges to $I_{grid\_ref}$.

FIG. 6B shows an example 650 of control circuitry for controlling switches 120 and 122 in accordance with some embodiments. Control circuitry 650 can be similar to control circuitry 600, except that grid current controller 612 and PWM 614 can be replaced by a hysteresis controller 652 for controlling switches 120 and 122. In such embodiments, an adaptive band can be used to reduce the range of switching frequency variations in the control of switches 120 and 122.

Figure 7A:
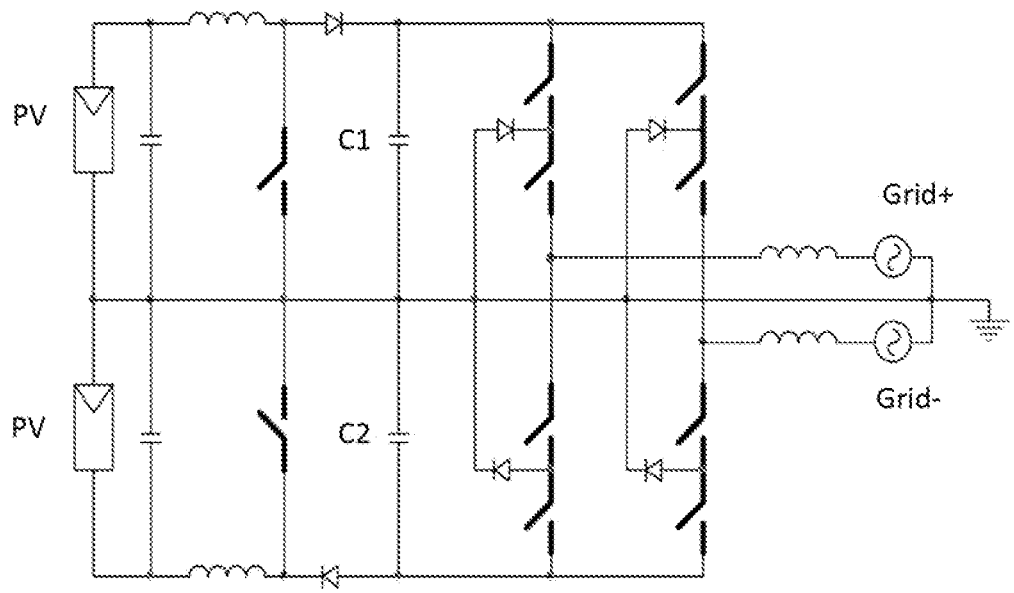
FIGS. 7A and 7B show examples of a fifth photoelectric inverter and a sixth photovoltaic inverter in accordance with some embodiments of the disclosed subject matter.
Figure 7B:
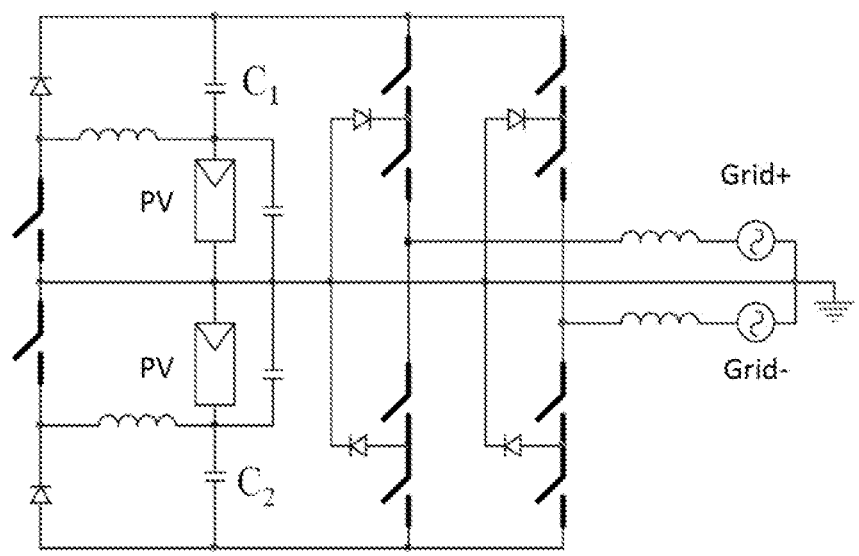

FIGS. 7A and 7B show examples 700 and 750 of photo-voltaic inverters in accordance with some embodiments. Each of the inverters 700 and 750 are split phase inverters for which the PV array can be grounded and for which capacitors of similar size as described above in connection with the inverters of FIGS. 1 to 4 can be used.

In some embodiments, inverter 700 can include a boost front-end stage that processes full power and a neutral-point clamped (NPC) inverter stage. This configuration can allow the voltages across capacitors C1 and C2 of FIG. 7A to vary over a wide voltage range. This in turn allows for inverter 700 to handle 120 Hz power pulsations that result from the DC-AC inversion process while not requiring large capacitances that may require the use of electrolytic-based capacitors.

Inverter 750 is similar to inverter 700, except a buck-boost stage is used that is somewhat similar to the buck-boost stage used in the configurations described in connection with FIGS. 1 to 4.

It should be noted that the configurations of inverters 700 and 750 use twice as many switches as the inverters described in FIGS. 1 to 4. This allows for the output from two PVs to be regulated simultaneously using switches that are rated for lower voltages (e.g., half the voltage rating) than the switches used in the configurations of FIGS. 1 to 4.

It should also be noted that the control techniques described in connection with FIGS. 5, 6A, and 6B are not limited to use with the configuration described in connection with FIG. 1, but can be adapted for use with any of the configurations described herein (e.g., as shown in FIGS. 1-4, 7A, and 7B) or any other suitable configuration, with adjustments made for the number of switches used and values of control parameters.

The power inverter mechanisms are described as being used in connection with a photo-voltaic DC power source. However, the power inverter mechanisms can be used to convert power from any suitable DC source for use with an AC load, such as a grid. For example, the power inverter can be used for conversion of DC power from a wind turbine generator, a hydro-electric generator, a battery, etc.

Although the invention has been described and illustrated in the foregoing illustrative embodiments, it is understood that the present disclosure has been made only by way of example, and that numerous changes in the details of implementation of the invention can be made without departing from the spirit and scope of the invention, which is limited only by the claims that follow. Features of the disclosed embodiments can be combined and rearranged in various ways.

What is claimed is:

1. A power inverter circuit comprising:
a first input terminal for connection to a first side of a direct current source coupled to a first conductor of an alternating current transmission line;
a first side of a capacitor coupled to the first input terminal;
a second input terminal for connection to a second side of the direct current source coupled to a first side of a first switch and a first side of a second switch;
a second side of the capacitor coupled to a first side of a third switch and a first side of a fourth switch;
a first side of a first inductor coupled to the first input terminal, the first side of the capacitor and the first conductor;
a second side of the first inductor coupled to a second side of the first switch and a second side of the third switch; and
a first side of a second inductor coupled to a second conductor of an alternating current transmission line, a second side of the second switch and a second side of the fourth switch.

2. The power inverter circuit of claim 1, wherein the capacitor has a capacitance that allows a voltage across the capacitor to vary over a range of between 100 percent and 200 percent of a voltage across the first conductor and the second conductor during operation of the power inverter circuit.

3. The power inverter circuit of claim 1, wherein the second input terminal is coupled to a first side of a fifth switch, and wherein the power inverter circuit further comprises:
a sixth switch with a first side coupled to a first side of the second side of the third switch and a first side of the fourth switch, and a second side of the sixth switch coupled to a second side of the fifth switch and a first side of a third inductor, wherein a second side of the third inductor is coupled to a third conductor of the alternating current transmission line.

4. The power inverter circuit of claim 3, further comprising a control circuit that controls a phase shift between first control signals that control a state of the second switch and a state of the fourth switch and second control signals that control a state of the fifth switch and a state of the sixth switch to reduce a switching frequency ripple in a current on the first conductor.

5. The power inverter circuit of claim 1, further comprising:
a control circuit that controls a state of the first switch and that controls a state of the third switch such that a maximum power point of an output of a direct current source coupled across the first input terminal and the second input is tracked, the control circuit comprising:
a maximum power point tracking circuit that uses a voltage output of the direct current source and a current output of the direct current source as inputs, and that outputs a reference current for the direct current source; and
a proportional integral controller that uses a difference between the reference current and the current output of the direct source as an input, and that outputs a duty cycle at which to control the first switch and the third switch to yield a maximum power output from the direct current source.

6. The power inverter circuit of claim 1, further comprising:
a control circuit that controls a state of the second switch and that controls a state of the fourth switch such that power conversion efficiency of the power inverter circuit is maximized based on a voltage output of the direct current source, a current output of the direct current source, and a voltage of the second conductor of the alternating current transmission line.

7. The power inverter circuit of claim 6, wherein the state of the second switch and the state of the fourth switch is controlled based on an output of either (i) a pulse width modulator, or (ii) a hysteresis controller.

8. The power inverter circuit of claim 1, further comprising a control circuit that controls a phase shift between first control signals that control a state of the first switch and a state of the third switch and second control signals that control a state of the third switch and a state of the fourth switch to reduce a switching frequency ripple in a voltage across the first conductor and the second conductor.

9. The power inverter circuit of claim 1, further comprising a photovoltaic direct current source coupled between the first input terminal and the second input terminal.

10. The power inverter circuit of claim 1, wherein an output voltage of the power inverter circuit is an alternating current signal having a root mean square voltage of between 120 V RMS and 240 V RMS.

11. The power inverter of claim 1, wherein the capacitor has a capacitance of between about 10 microfarads per kilowatt of output power and about 30 microfarads per kilowatt of power.

12. A power inverter circuit comprising:
a first input terminal means for connecting to a first side of a direct current source and coupled to a first conductor of an alternating current transmission line;
a first side of a capacitance means for causing a capacitance to be provided coupled to the first input terminal means;
a second input terminal means for connecting to a second side of the direct current source and coupled to a first side of a first switching means for causing a first circuit to be alternately substantially shorted or opened and coupled to a first side of a second switching means for causing a second circuit to be alternately substantially shorted or opened;
a second side of the capacitor means coupled to a first side of a third switching means for causing a third circuit to be alternately substantially shorted or opened and a first side of a fourth switching means for causing a fourth circuit to be alternately substantially shorted or opened;
a first side of a first induction means for causing an inductance to be provided coupled to the first input terminal means, the first side of the capacitance means and the first conductor;
a second side of the first induction means coupled to a second side of the first switching means and a second side of the third switching means; and
a first side of a second induction means for causing an inductance to be provided coupled to a second conductor of an alternating current transmission line, a second side of the second switching means and a second side of the fourth switching means.

13. The power inverter circuit of claim 12, wherein the capacitance means provides a capacitance that allows a voltage across the capacitance means to vary over a range of between 100 percent and 200 percent of a voltage across the first conductor and second conductor during operation of the power inverter circuit.

14. The power inverter circuit of claim 12, wherein the second input terminal means is coupled to a first side of a fifth switching means for causing a fifth circuit to be alternately substantially shorted or opened, and wherein the power inverter circuit further comprises:
a sixth switching means for causing a sixth circuit to be alternately substantially shorted or opened having a first side coupled to a first side of the second side of the third switching means and a first side of the fourth switching means, and a second side of the sixth switching means coupled to a second side of the fifth switching means and a first side of a third induction means for causing an inductance to be provided, wherein a second side of the third induction means is coupled to a third conductor of the alternating current transmission line.

15. The power inverter circuit of claim 14, further comprising control means for controlling a phase shift between first control signals that control a state of the second switch and a state of the fourth switch and second control signals that control a state of the fifth switch and a state of the sixth switch to reduce a switching frequency ripple in a current on the first conductor.

16. The power inverter circuit of claim 12, further comprising:
a control means for controlling a state of the first switch and a state of the third switch such that a maximum power point of an output of a direct current source coupled across the first input terminal and the second input is tracked, the control circuit comprising:
a maximum power point tracking means for outputting a reference current for the direct current source using a voltage output of the direct current source and a current output of the direct current source as inputs; and
a proportional integral controlling means for outputting a duty cycle at which to control the first switch and the third switch to yield a maximum power output from the direct current source that uses a difference between the reference current and the current output of the direct source as an input.

17. The power inverter circuit of claim 12, further comprising:
a control means for controlling a state of the second switching means and a state of the fourth switching means for maximizing a power conversion efficiency of the power inverter circuit is based on a voltage output of the direct current source, a current output of the direct current source, and a voltage of the second conductor of the alternating current transmission line.

18. The power inverter circuit of claim 17, wherein the state of the second switch and the state of the fourth switching means is controlled based on an output of either (i) a pulse width modulating means for driving the second switching means and the fourth switching means, or (ii) a hysteresis controlling means for driving the second switching means and the fourth switching means.

19. The power inverter circuit of claim 12, further comprising a control means for controlling a phase shift between first control signals that control a state of the first switch and a state of the third switch and second control signals that control a state of the third switch and a state of the fourth switch to reduce a switching frequency ripple in a voltage across the first conductor and the second conductor.

20. The power inverter circuit of claim 12, further comprising a photovoltaic direct current means for supplying a direct current coupled between the first input terminal means and the second input terminal means.

21. The power inverter circuit of claim 12, wherein an output voltage of the power inverter circuit is an alternating current signal having a root mean square voltage of between 120 V RMS and 240 V RMS.

22. The power inverter of claim 12, wherein the capacitance means provides a capacitance of between about 10 microfarads per kilowatt of output power and about 30 microfarads per kilowatt of power.

* * * * *